United States Patent Office 3,725,210
Patented Apr. 3, 1973

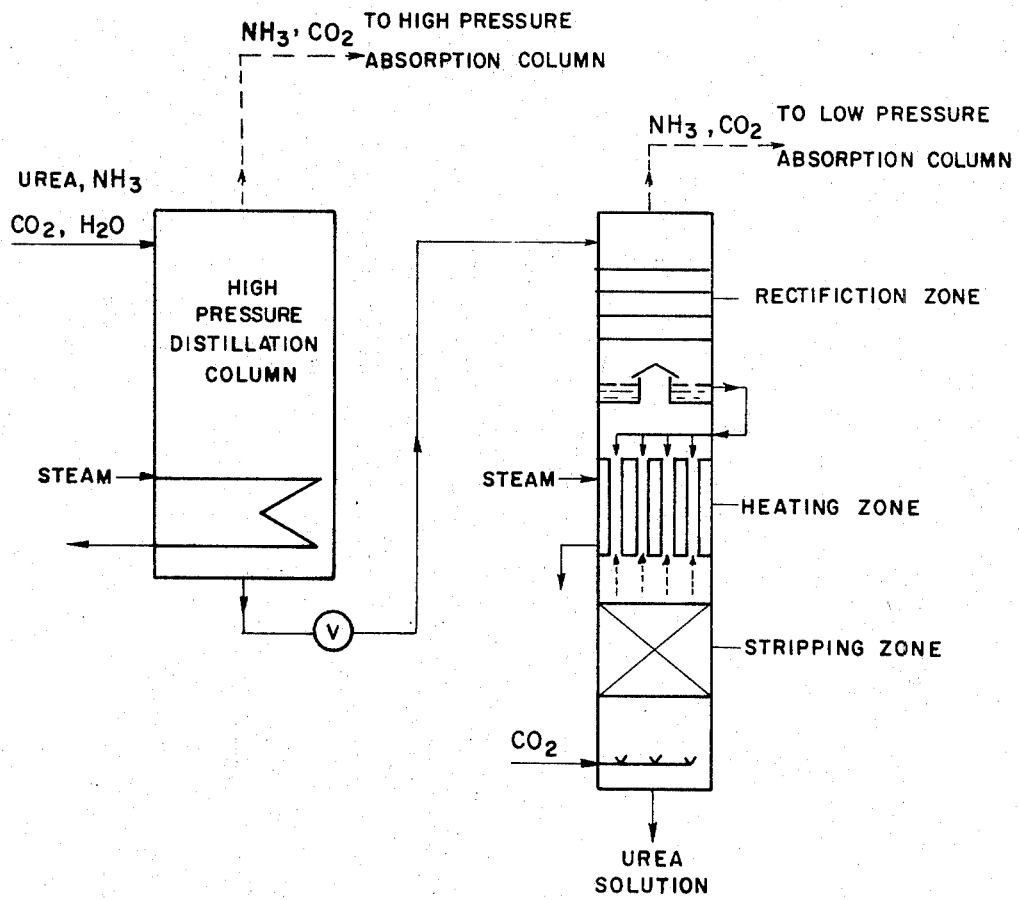

3,725,210
METHOD OF REMOVING UNREACTED MATERIALS REMAINING IN UREA SYNTHESIS EFFLUENT BY PLURAL STAGE DISTILLATION AND $CO_2$ STRIPPING
Eiji Otsuka and Kazumichi Kanai, Fujisawa, Shigeru Inoue, Kamakura, and Novuyoshi Hashimoto, Yokohama, Japan, assignors to Mitsui Toatsu Chemicals Incorporated, Tokyo, Japan
Filed Aug. 18, 1970, Ser. No. 64,805
Claims priority, application Japan, Aug. 30, 1969, 44/68,311
Int. Cl. C07c *127/04*
U.S. Cl. 203—42          10 Claims

ABSTRACT OF THE DISCLOSURE

Urea synthesis effluent from which the major portion of unreacted carbon dioxide and ammonia have been removed, is completely stripped of the remaining unreacted materials by passing the effluent through a column having a rectification zone maintained at a gauge pressure of 0 to 5 kg./cm.$^2$ and a head temperature of 60° to 120° C., a heating zone maintained at 100° to 140° C. and a stripping zone wherein carbon dioxide is introduced at the rate of 0.01 to 0.2 mol per mol of urea contained in the effluent, whereby the unreacted materials are completely removed from the urea synthesis effluent.

---

This invention relates to a low pressure method of completely removing the unreacted materials remaining in a urea synthesis effluent from which the major portion of unreacted materials has been removed by high pressure distillation.

A known total recycle urea synthesis process includes the following steps: ammonia and carbon dioxide are reacted together at high temperatures and pressures; the resulting urea synthesis effluent is successively distilled in high pressure and low pressure stages to separate unreacted materials as a gaseous mixture in each stage; the gaseous mixture from the low pressure distillation is absorbed in an absorbent to obtain an absorbate; the absorbate is pressurized and used to absorb the gaseous mixture from the high pressure distillation and the resulting high pressure absorbate is recycled to the urea synthesis reactor. In absorbing the unreacted materials in the absorbent, the phase equilibrium is determined by a combination of the absorbing pressure, amount of the absorbent and the absorbing temperature. It is preferable to minimize the amount of absorbent used. Therefore, an absorbing pressure which is substantially equal to the distilling pressure is preferred in order to maintain a desirable absorption equilibrium. The amounts of residual unreacted materials in the distillate from the high pressure distillation may fluctuate substantially.

During the low pressure distillation, if the unreacted materials are not removed from the urea containing solution, the efficiency of the process is substantially reduced. However, if the amount of the absorbent used in the low pressure absorption is limited, the pressure of the low pressure distillation, which is substantially the same as the absorbing pressure, must be increased considerably because of the equilibrium required for absorption. Pressures of 1 to 5 kg./cm.$^2$ guage which are used in the conventional low pressure distillation, result in the incomplete separation of the unreacted materials from the aqueous urea solution and in a loss of the unseparated materials. Therefore, it has been necessary to separate the remaining unreacted materials by further distillation at a low pressure and to recover the separated unreacted materials by absorption in an absorbent.

Stripping unreacted materials from a urea synthesis effluent under a pressure above 10 kg./cm.$^2$ using carbon dioxide is also known. However, if this method is used to separate residual unreacted materials at a lower pressure, the amount of water in the gaseous mixture containing the separated materials from the low pressure distillation is substantially increased by water evaporated from the effluent by the carbon dioxide. Therefore, the mother liquor from urea crystallization step, which is used as the low pressure absorbent, is undesirably diluted by this water.

It is therefore an object of the present invention to provide a method of substantially completely separating the unreacted carbon dioxide and ammonia remaining in a urea synthesis effluent as a gaseous mixture having a low water content.

The present invention comprises complete separation of carbon dioxide and ammonia remaining in a urea synthesis effluent after removing the greater part of these unreacted materials from said urea synthesis effluent by high pressure distillation. The urea synthesis effluent containing the remaining unracted materials is introduced into a low pressure rectification zone maintained at a gauge pressure of 0 to 5 kg./cm.$^2$ and a head temperature of 60° to 120° C., then into a heating zone maintained at 100° to 140° C. and finally into a stripping the urea synthesis effluent zone wherein is stripped with 0.01 to 0.2 mol of carbon dioxide per mol of urea contained in said urea synthesis effluent in order to remove substantially all of the ammonia and carbon dioxide therefrom.

In the present invention, a urea synthesis effluent having had the greater portion of unreacted materials removed is distilled at a low pressure in the rectification zone and the urea solution from the low pressure distillation is heated and then contacted with carbon dioxide to strip substantially all of the unreacted materials therefrom. If the unreacted materials remaining in the urea solution are stripped under a low pressure, the water content in the gaseous mixture is increased by the amount of that carried by the carbon dioxide. Therefore, in order to control the increase of water content, it is preferred that the gaseous mixture is discharged through a rectification zone with a minimum head temperature. In the present invention, the head temperature of the low pressure distillation column is maintained in the range of 60° to 120° C. Therefore, when the unreacted materials are stripped with carbon dioxide, the water content in the gaseous mixture is minimized. Thus, in spite of the increased amount of gaseous mixture, the total amount of water accompanying the gaseous mixture is increased by only a very small amount. The temperature of the heating zone is preferably mainained at 100° to 140° C.

Carbon dioxide is a far more efficient gas than either nitrogen or air for stripping the unreacted materials from a urea synthesis effluent. Therefore, the amount of carbon dioxide necessary is very small and thus, the amount of less accompanying water vapor is also very small.

The carbon dioxide introduced into the stripping zone is ultimately absorbed together with the unreacted ammonia and carbon dioxide in the low pressure absorption step and acts to reduce the pressure necessary for equilibrium therein. Therefore, the amount of the absorbent used in low pressure absorbing step can be reduced. In a conventional process, the greater part of the unreacted materials is removed by high pressure distillation under a gauge pressure of 10 to 100 kg./cm.$^2$ as a gaseous mixture of ammonia and carbon dioxide and said gaseous mixture is absorbed in the absorbate from the low pressure absorption. The amount of absorbent present in the absorbate from the low pressure absorption of the prior art processes is larger than the amount required for the high pressure absorption. However, the method of the present invention corrects this defect.

The carbon dioxide introduced into the low pressure stripper is ultimately used as a part of the raw material for a subsequent urea synthesis. The amount of carbon dioxide must be from about 0.01 to 0.2 mol and preferably from 0.02 to 0.1 mol per mol of urea introduced into the stripping zone in order to maintain the proper balance of synthesis reactants. Amounts above 0.2 mol carbon dioxide per mole of urea are more favorable for stripping the residual unreacted substances but then the total amount of water distilled out in the low pressure rectification zone increases, the amount of heat-of-absorption removed in the low pressure absorbing step increases and the concentration of ammonium carbamate in the absorbate beocmes so high that crystals of this compound tend to be deposited. If the amount of carbon dioxide used is less than 0.01 mol, the amount of the unreacted materials discharged from the low pressure rectification zone is unsatisfactory.

The method of the present invention preferably utilizes apparatus as shown in the drawing comprising an integral column having a rectification zone, heating zone and stripping zone so that a urea synthesis effluent having the greater part of the unreacted materials removed therefrom may successively pass through each of these zones. However, a separate rectification column, heater and stripper may be used.

The rectification and heating zones are maintained at the above described head and still temperatures. It is preferable that the rectification zone is a plate column of a structure having several steps of sieve trays or bubble-cap trays or has a structure corresponding. However, the rectification zone is not limited to a plate column but, also, may be a packed column.

The heating zone is preferably a multitubular heat-exchanger a reboiler, single pass or falling film design. If hydrolysis of a portion of the urea and production of biuret is not undesirable, an ordinary reboiler may be used as the structure of the heating zone. However, if hydrolysis of urea, biuret formation and the amount of the residual unreacted materials are critical, a heater of the falling film or single pass design is preferable.

The stripping zone is preferably a packed column provided with a carbon dioxide inlet at the lower end and having no heater.

The urea synthesis effluent having the greater part of unreacted materials removed is adjusted to a gauge pressure of 0 to 5 kg./cm.$^2$ and is introduced into the rectification zone maintained at the above described temperature. The urea synthesis effluent separated in the upper part of the rectification zone from the gaseous mixture of ammonia and carbon dioxide formed by the expansion of said effluent flows down through the rectification zone and is heated to a temperature of 100° to 140° C. in the heating zone whereby a gaseous mixture of the greater part of the unreacted materials remaining therein is separated. This separated gaseous mixture ascends through the rectification zone in countercurrent flow to the descending urea synthesis effluent. A portion of the water vapor from the heating zone is condensed in the rectification zone and the remainder is discharged from the top of the rectification zone with the unreacted gases. As described above, the heater may preferably be of the falling film type. When this type of heater is used, the separated gaseous mixture of ammonia and carbon dioxide therein in countercurrent flow to the urea synthesis effluent descending as a film and thence is discharged through the rectification zone. Alternatively, the separated gaseous mixture may descend concurrently with the urea synthesis effluent and then discharged through the rectification zone. The amount of ammonia remaining in the urea solution is smaller when heating by concurrent flow than when heating by countercurrent flow as shown in the following table.

| Heating method | Temperature | |
| --- | --- | --- |
| | 125° C. | 130° C. |
| Countercurrent | 0.60 | 0.4 |
| Concurrent | 0.46 | 0.30 |

Furthermore, when comparing a reboiler with a falling film type heater, it has been found that the operating pressure necessary to obtain a content of 0.9 weight percent residual ammonia in the urea solution after heating at the same heating temperature is 4.5 to 4.8 kg./cm.$^2$ gauge with the falling film type heater but only 1.7 to 1.9 kg./cm.$^2$ gauge with the reboiler heater. Thus, the unreacted materials can be separated to this extent at a higher pressure with a falling film type of heater. Therefore, the absorption pressure of the gaseous mixture from the low pressure distillation can be desirably increased and the amount of the absorbent is reduced.

The urea solution from the heating zone still contains a small amount of unreacted materials. This urea solution is introduced into the top of the stripping zone and countercurrently contacted with carbon dioxide while flowing through the packed zone to remove substantially all unreacted materials remaining therein. The same are described as a gaseous mixture of ammonia and carbon dioxide from the top of the stripping zone. The urea solution from the heating zone is not further heated in the stripping zone and the unreacted materials are stripped by the residual heat of the urea solution upon contact with the carbon dioxide. The gaseous mixture of ammonia and carbon dioxide separated in the stripping zone is preferably mixed with that separated in the heating zone and a part of the water vapor cointained therein is condensed in the rectification zone while all of the remaining gases are discharged from the top of the rectification zone. As an example to illustrate the advantage of passing the gaseous mixture through the rectification zone, a urea synthesis effluent having the greater part of the unreacted materials removed was introduced into a rectification zone operated at a gauge pressure of 2 kg./cm.$^2$ and a heating zone operated at 125° C. The amount of urea synthesis effluent fed was 848 parts by weight and the amount of carbon dioxide used for stripping was 23 parts by weight. The water content in the gases was 23.6% by weight when the gaseous mixture from the heating and stripping zones was passed through the rectification zone but increased to 38.7% by weight when not passed through the rectification zone.

The greater part of the unreacted materials is initially removed from the urea synthesis effluent by a high pressure distillation, preferably under 10 to 100 kg./cm.$^2$ gauge. The high presure distillation may be a single distillation but it is preferably rectified by introducing the urea synthesis effluent into the top of a high pressure rectification column kept at a head temperature of 90° to 150° C. and a still temperature of 130° to 180° C. Also, excess ammonia may be separated without heating by expanding the urea synthesis effluent prior to high pressure distillation. The high pressure distillation may be conducted in a plurality of successively reduced pressure stages. Also, the unreacted materials may be stripped off with carbon dioxide or ammonia at a high pressure such as the urea synthesis pressure in addition to or instead of using high pressure distillation.

In practicing the method of the present invention, unreacted materials in a urea synthesis effluent, after the major portion of the unreacted substance has been removed, can be substantially completely separated in a single pressure stage and the amount of the absorbent necessary is less than that of the conventional low pressure distillation with two pressure stages. Therefore the reactant ratio for urea synthesis is improved in addition to the saving of steam consumption and electrical power.

In the following example of the present invention, parts are by weight and pressure is gauge pressure.

EXAMPLE

Unreacted materials contained in the urea synthesis effluent from a high pressure distillation column were separated using a low pressure column at 2 kg./cm.$^2$ column having a rectification zone with four seive trays in the upper portion, a heating zone having a falling film type heater in the middle portion and a stripping zone having a packed column with a height of 3 meters in the lower portion.

A urea synthesis effluent discharged from a high pressure distillation column containing 204.5 parts urea, 26.3 parts ammonia, 8.6 parts carbon dioxide and 107.8 parts water was fed into the upper part of the rectification zone and permitted to flow down through the sieve trays. The effluent was then heated while falling as a thin film on the surface of a heating tube maintained at 125° C. in the heating zone to a gas separator in the lower part of the heating zone where gaseous materials were separated. The solution then flowed through the stripping zone and was contacted with 9.0 parts carbon dioxide introduced into the lower part of the zone. Substantially all ammonia and carbon dioxide in the effluent were removed and a urea solution containing 204.5 parts of urea and 89.8 parts of water was obtained. The solution which was discharged from the stripping zone had a temperature of 110° C.

A gaseous mixture comprising the carbon dioxide introduced from the stripping zone, ammonia and carbon dioxide separated in the stripping zone and ammonia and carbon dioxide separated in the heating zone was passed through the rectification zone wherein the gaseous mixture contacted the urea synthesis effluent supply and was dehydrated. A gas mixture comprising 26.3 parts of ammonia, 17.6 parts of carbon dioxide and 18.0 parts of water was discharged from the top of the distillation column.

What is claimed is:

1. In a method of separating unreacted materials from a urea synthesis effluent wherein ammonia and carbon dioxide are reacted at urea forming temperature and pressure to form a urea synthesis effluent containing urea, water and unreacted ammonia and carbon dioxide, the greater part of said unreacted materials is separated at a high pressure of at least 10 kg./cm.$^2$ gauge as a gaseous mixture of ammonia and carbon dioxide leaving a depleted urea synthesis effluent, the remaining part of said unreacted materials contained in said depleted urea synthesis effluent is separated at a low pressure as a gaseous mixture of ammonia and carbon dioxide, said gaseous mixtures are absorbed in an absorbent and the resulting absorbate is recycled to said urea synthesis reaction, the improvement which comprises introducing said depleted urea synthesis effluent into a low pressure rectification zone maintained at a gauge pressure of 0 to 5 kg./cm.$^2$ and a head temperature of 60° to 120° C., passing the depleted urea synthesis effluent from the rectification zone into a heating zone maintained at 100° to 140° C. to remove the major part of said remaining unreacted materials in the form of a gaseous mixture of ammonia and carbon dioxide, passing the depleted urea synthesis effluent from said heating zone into a stripping zone and contacting said effluent with 0.01 to 0.2 mol of carbon dioxide per mol of urea contained in said effluent to remove substantially all of the remaining unreacted materials contained therein as a gaseous mixture of ammonia and carbon dioxide.

2. A method as claimed is claim 1 wherein the greater part of the unreacted ammonia and carbon dioxide contained in the urea synthesis effluent is separated by a high pressure distillation at a gauge pressure of 10 to 100 kg./cm.$^2$.

3. A method as claimed in claim 1 wherein the greater part of the unreacted ammonia and carbon dioxide contained in the urea synthesis effluent is separated by stripping with carbon dioxide at the urea synthesis pressure.

4. A method as claimed in claim 1 wherein the depleted urea synthesis effluent from the rectification zone is contacted with a multitubular heat-exchanger in said heating zone.

5. A method as claimed in claim 1 wherein the depleted urea synthesis affluent from the rectification zone is contacted with a falling film type heater in said heating zone to separate said gaseous mixture of ammonia and carbon dioxide.

6. A method as claimed in claim 5 wherein the gaseous mixture of ammonia and carbon dioxide flows concurrently with the depleted urea synthesis effluent.

7. A process as claimed in claim 5 wherein the gaseous mixture of ammonia and carbon dioxide flows countercurrently to the depleted urea synthesis effluent.

8. A method as claimed in claim 1 wherein the gaseous mixture of ammonia and carbon dioxide from said heating zone is passed through said rectification zone.

9. A method as claimed in claim 1 wherein the gaseous mixture of ammonia and carbon dioxide from the stripping zone is passed through the rectification zone.

10. A method as claimed in claim 6 wherein the gaseous mixture of ammonia and carbon dioxide from said heating zone is passed through said rectification zone combined with the gaseous mixture of ammonia and carbon dioxide from said stripping zone.

References Cited
UNITED STATES PATENTS

| | | | |
|---|---|---|---|
| 3,146,263 | 8/1964 | Otsuka | 260—555 A |
| 3,357,901 | 12/1967 | Otsuka et al. | 203—80 |
| 3,436,317 | 4/1969 | Otsuka et al. | 203—73 |
| 3,506,710 | 4/1970 | Inoue et al. | 203—73 |
| 3,090,811 | 5/1963 | Otsuka et al. | 260—555 A |
| 3,390,058 | 6/1968 | Otsuka et al. | 260—555 A |
| 3,258,486 | 6/1966 | Cook | 260—555 A |
| 2,848,493 | 8/1958 | Dewling et al. | 260—555 A |

WILBUR L. BASCOMB, JR., Primary Examiner

U.S. Cl. X.R.

203—49, 72, 78, 80; 260—555 A